US012548472B2

(12) United States Patent
Unglert

(10) Patent No.: US 12,548,472 B2
(45) Date of Patent: Feb. 10, 2026

(54) FUNCTIONAL LABEL AND METHOD FOR PRODUCING A FUNCTIONAL LABEL

(71) Applicant: Schreiner Group GmbH & Co. KG, Oberschleissheim (DE)

(72) Inventor: Robert Unglert, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 177 days.

(21) Appl. No.: 18/288,880

(22) PCT Filed: Apr. 22, 2022

(86) PCT No.: PCT/EP2022/060672
§ 371 (c)(1),
(2) Date: Oct. 30, 2023

(87) PCT Pub. No.: WO2022/233593
PCT Pub. Date: Nov. 10, 2022

(65) Prior Publication Data

US 2024/0203294 A1 Jun. 20, 2024

(30) Foreign Application Priority Data

May 4, 2021 (DE) ..................... 10 2021 111 468.3

(51) Int. Cl.
*G09F 3/02* (2006.01)
*G09F 3/10* (2006.01)

(52) U.S. Cl.
CPC .................. *G09F 3/02* (2013.01); *G09F 3/10* (2013.01); *G09F 2003/0201* (2013.01);
(Continued)

(58) Field of Classification Search
None
See application file for complete search history.

(56) References Cited

U.S. PATENT DOCUMENTS 5,738,381 A 4/1998 Treleaven et al.
5,967,560 A 10/1999 Seidl
6,015,470 A 1/2000 Treleaven et al.
6,019,046 A 2/2000 Rodi
(Continued)

FOREIGN PATENT DOCUMENTS

DE 103 07 250 A1 9/2004
DE 697 30 978 T2 10/2005
(Continued)

OTHER PUBLICATIONS

International Search Report in PCT/EP2022/060672, mailed Aug. 25, 2022.
(Continued)

*Primary Examiner* — Austin Murata
(74) *Attorney, Agent, or Firm* — Collard & Roe, P.C.

(57) ABSTRACT

A method of manufacturing a functional label includes providing a source material having one or more label layers and performing a first printing process and thereby forming a print on the source material using a first printing device. The method further includes performing a first die cutting process and thereby forming a functional die cut in the source material using a first die cutting device. The method further includes performing a second printing process separate from the first printing process and thereby forming a digital print on the source material using a second printing device. The method further includes performing a second die-cutting operation separate from the first die cutting operation and thereby forming a format die-cut in the source material using a second die cutting device and thereby forming the functional label.

13 Claims, 4 Drawing Sheets

Figure 1:
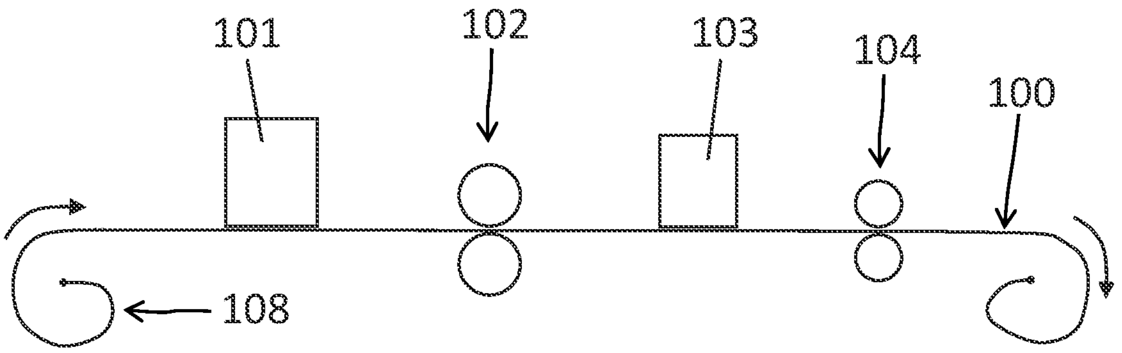

(52) U.S. Cl.
CPC ................ *G09F 2003/0257* (2013.01); *G09F 2003/0267* (2013.01); *G09F 2003/0269* (2013.01)

(56) References Cited

U.S. PATENT DOCUMENTS

| | | | |
|---|---|---|---|
| 6,102,441 | A | 8/2000 | Treleaven et al. |
| 7,143,536 | B2 | 12/2006 | Moosheimer et al. |
| 7,211,312 | B2 | 5/2007 | Moosheimer |
| 2002/0050084 | A1 | 5/2002 | Satamian |
| 2002/0078841 | A1 * | 6/2002 | McKillip ................ B41F 17/02 101/227 |
| 2008/0074453 | A1 * | 3/2008 | Furukawa .............. B41J 2/2142 347/14 |
| 2010/0212526 | A1 | 8/2010 | Schulmeister et al. |
| 2014/0005608 | A1 * | 1/2014 | Schreiner .................. G09F 3/02 264/219 |
| 2024/0217197 | A1 * | 7/2024 | Unglert ................ B41M 5/0047 |

FOREIGN PATENT DOCUMENTS

| | | | |
|---|---|---|---|
| DE | 10 2015 208 042 | A1 | 11/2016 |
| EP | 0 737 570 | A2 | 10/1996 |
| EP | 1 453 027 | A2 | 9/2004 |
| EP | 1 507 248 | A1 | 2/2005 |
| WO | 95/29813 | A1 | 11/1995 |
| WO | 97/42089 | A1 | 11/1997 |
| WO | WO 97/42089 | * | 11/1997 |
| WO | 2009/043551 | A1 | 4/2009 |
| WO | 2020/222209 | A1 | 11/2020 |
| WO | WO 2020/222209 | * | 11/2020 |

OTHER PUBLICATIONS

German Search Report dated Oct. 11, 2021 in German Application No. 10 2021 111 468.3, with English translation of the relevant parts.

* cited by examiner

FUNCTIONAL LABEL AND METHOD FOR PRODUCING A FUNCTIONAL LABEL

CROSS REFERENCE TO RELATED APPLICATIONS

This application is the National Stage of PCT/EP2022/060672 filed on Apr. 22, 2022, which claims priority under 35 U.S.C. § 119 of German Application No. 10 2021 111 468.3 filed on May 4, 2021, the disclosure of which is incorporated by reference. The international application under PCT article 21(2) was not published in English.

The present invention relates to a method for producing a functional label which can contribute to reliable marking of an object in a simple and inexpensive manner. The invention also relates to a functional label which can be produced, in particular, by means of such a method.

A label can serve in particular for identification or proof of origin with respect to an object to be identified. For example, labels are used when it is necessary to indicate ingredients of a container. This applies in particular to containers in the pharmaceutical and medical fields, the ingredients of which are to be indicated by the label and also protected against manipulation, for example, by specific functions of the label.

It is an objective underlying the invention to provide a method that enables simple and inexpensive production of a functional label that can contribute to reliable identification of an object. It is further an objective underlying the invention to provide a corresponding functional label.

The objectives are achieved by the features of the respective independent patent claims. Advantageous embodiments and developments are indicated in the associated dependent patent claims.

According to an aspect of the invention, a method of manufacturing a functional label comprises providing an initial label or a source material having one or more label layers formed, for example, as one or more adhesive or non-adhesive paper and/or film layers. The method further comprises performing a first printing process and thereby forming a print on the starting label by means of a first printing device. The method further comprises performing a first die cutting process and thereby forming a functional die cut in the output label by means of a first die cutting device. The method further comprises performing a second printing process separate from the first printing process and thereby forming a digital print on the output label by means of a second printing device capable of forming a digital print. The method further comprises performing a second die-cutting process separate from the first die-cutting process, thereby forming a format die-cut in the output label by means of a second die-cutting device, thereby forming the functional label.

By means of the described method, a functional label can be produced in a simple and cost-effective manner, which enables reliable marking of an object. The method implements an efficient manufacturing process for producing functional labels using hybrid printing and separate die cutting operations. In particular, conventional printing processes (such as flexographic printing, screen printing, etc.) and digital printing can be combined. Alternatively, however, the first printing process can also be set up to form a further digital print on one or more label layers of the initial label. By means of the method described, in particular, no grade change is required to form the functional label and corresponding manufacturing costs can be kept low.

In the following, the invention will be described, where applicable, in connection with an initial label, which is usually preceded by the source material from which an initial label or the functional label is formed after a format die-cutting operation. Accordingly, where applicable, the properties and characteristics of the initial label may also be transferred to the source material or a starting material web which are provided for forming the functional label.

According to an embodiment of the method, performing the first die-cutting process and forming the functional die-cut comprises introducing at least one die-cut, cut, slit and/or perforation into the initial label and forming a label area that can be lifted off relative to an adjacent label area so that an hanger element can be folded out of the functional label. In this way, a digitally printed functional label can be realized which has a selectively introduced dispensing overlap which enables the formation of a stirrup or a hanging tab.

According to a further embodiment of the method, performing the first die-cutting process and forming the functional die-cut comprises introducing at least one die-cut, cut, slit and/or perforation into the initial label and forming a weakened zone in a label area which is predetermined with respect to an intended operational use of the functional label and tensile forces acting in the process. By means of such a deliberately introduced weakening zone, an improved tear strength of the functional label can be contributed to. In particular, the weakening zone is arranged or formed in one or more areas which would be at risk of tearing during intended use of the functional label. This is the case, for example, in the vicinity of internal edges, indentations, perforations, slits and/or punched holes. Thus, for example, a weakening zone can be realized by means of a purposefully introduced safety punching, which can reduce stress peaks due to acting tensile forces during use of the functional label.

According to a further embodiment of the method, the initial label is provided as a multilayer label with a plurality of label layers, and the first die-cutting operation is carried out in such a way that the functional die-cutting is carried out in or on one or more, but not all, label layers. Thus, for example, the functional die-cutting comprises one or more introduced openings in the form of cuts, slits and/or perforations, wherein, for example, a lowermost layer of the functional label remains free of additional introduced openings. Alternatively, all label layers can also have inserted openings which are arranged and formed in particular offset from one another so that they differ, for example, from a format die-cutting which extends, for example, with respect to a stacking direction through all label layers.

The label layers may in particular be implemented as respective layers or sections of material webs. In addition, one or more adhesive layers may also be present between, above or below such layers and may also be considered label layers. For example, two layers are provided for the initial label, which are processed by means of the hybrid printing and the format die-cutting and the functional die-cutting and, coupled with one another, form the functional label. If such initial layers are then glued together, for example, the functional label can be described as two-layered or also as a label which has three label layers including the adhesive layer.

According to a further embodiment, the method preferably comprises providing a first label layer and a second label layer, and performing the first die-cutting process and forming a functional die-cut in the first label layer and in the second label layer, such that the two label layers have at least one die-cut, slit and/or perforation and/or cut penetrating through them, respectively. Such a purposefully introduced opening in the respective label layer is purposefully formed with respect to a main extension plane of the functional label and transversely to a stacking direction of the functional label in such a way that they are arranged offset from one another.

The method may further be carried out such that the initial label is provided as a multilayer label having a plurality of label layers, and the first die-cutting process and the formation of the functional die-cut is carried out in at least one of the label layers before the label layers are coupled together. In other words, the die-cutting operation and the forming of the functional die-cut is performed in one or more of the label layers and subsequently the label layers are coupled together, for example glued. Preferably, further, the second printing process and the forming of the digital print is performed subsequently to the first die cutting process and the forming of the functional die cut. Accordingly, at least one die cutting operation is performed prior to the digital printing operation.

According to an embodiment of the method, an adhesive layer may further be applied to the initial label. In addition, an adhesive weakening element can be introduced into the adhesive layer at a predetermined position so that, after coupling the label layers, the adhesive layer is arranged between two label layers and the adhesive weakening element is placed in an area of the functional die-cut. For example, the two label layers each have a penetrating die-cut, which are offset along their main extension plane when the label layers rest on each other. The adhesive weakening element is then preferably arranged between these punchings, so that simple and reliable lifting of a label area from the underlying label area is possible.

A first label layer then forms, for example, an upper film layer which is bonded to a lower film layer which realizes the second label layer. For example, the functional label has a lift-off portion and a fixed portion, wherein a partial area of the lift-off portion is non-permanently adhesively bonded to a partial area of the fixed portion. For example, the lift-off portion and the associated partial area are portions of the upper film layer, and the fixed partial area forms a portion of the lower film layer. The adhesive weakening element is then disposed, for example, in the non-permanently adhesive partial area and serves as a means for reducing the adhesive force to form an easy and controlled fold-out of a hanger or suspension device.

The first printing process and the forming of the print may be performed as conventional printing and may include printing with silicone varnish and/or printing with adhesive neutralization. Alternatively or additionally, the first printing operation and the forming of the print may comprise the application of a further digital print. In particular, the second printing process and the forming of the digital print may comprise an inkjet print. Provided that the first printing process also comprises a digital print, the first printing process may also be based on an inkjet print. In addition, one or more further printing operations may also be performed, comprising an application of a varnish and/or an ink.

Preferably, the initial label is not provided as a single separate label but as a material web comprising a plurality of initial labels, each of which can be processed according to the described method steps. Accordingly, a processed material web with a plurality of functional labels preferably results.

According to a further aspect of the invention, a functional label comprises at least one label layer having a format die-cut and a separate functional die-cut as well as a first print and a separate second print, wherein at least the second print is configured as a digital print. In particular, the functional label may further comprise at least one cut, slit, and/or perforation introduced into the at least one label layer, such that a label area is formed that is liftable relative to an adjacent label area, thereby allowing a hanger element to be folded out of the functional label. Alternatively or additionally, a cut, slit and/or perforation may be provided in the functional label such that a weakened zone is formed in a label region which is predeterminedly placed with respect to an intended operational use of the functional label and tensile forces acting thereon.

The described functional label can be manufactured in particular by means of one of the previously described methods, so that the described properties and features of the method are also disclosed for the functional label and vice versa.

While the second printing process is a digital printing process, in one embodiment of the described manufacturing process, conventional flexographic printing can be performed in the first printing process. In addition to the die-cutting operation comprising a format die-cutting process, a separate die-cutting process is performed which is provided for setting up a predetermined function. Such a function is set up in particular by one or more purposefully made cuts, slits and/or perforations.

A production of web-shaped functional labels can combine, among other things, the following processing steps in a manufacturing process:

- at least one material web is provided, which forms a label layer of the initial label or labels,
- by means of at least one first printing station, a conventional and/or a digital print is applied to the material web,
- by means of at least one further printing station operating in digital printing, a digital print is applied to the material web, for example by means of an inkjet print,
- at least one format punching operation is carried out in or on the material web to form a predetermined shape and/or contour of the functional label, and
- at least one further die-cutting operation is carried out, which comprises in particular a die-cutting, slitting and/or/perforation operation, the further die-cutting operation being carried out separately from the format die-cutting.

Preferably, the manufacturing process comprises the following processing steps:

- at least two material webs forming a respective label layer of the initial label(s), wherein the at least one functional die-cutting operation is not performed on all material webs, for example only on one material web. This is then preferably carried out before at least one further material web is applied to it;
- then the printing process is carried out with at least one digital processing.

The described functional label can therefore be produced by means of the method by combining hybrid printing, which comprises at least one digital printing, and two die-cutting operations. The two different die-cutting operations comprise the format die-cutting, which serves in particular to give the functional label an external shape, and the function die-cutting, which is aimed at forming and providing a function. Such a purposefully introduced function can include, in particular, the creation of a hanging tab integrated into the functional label, which can be folded out of the functional label if required. Alternatively or additionally, a function may be realized by selectively introducing openings which, at predetermined positions, may contribute to a higher stability and tear resistance of the functional label.

Figure 2:
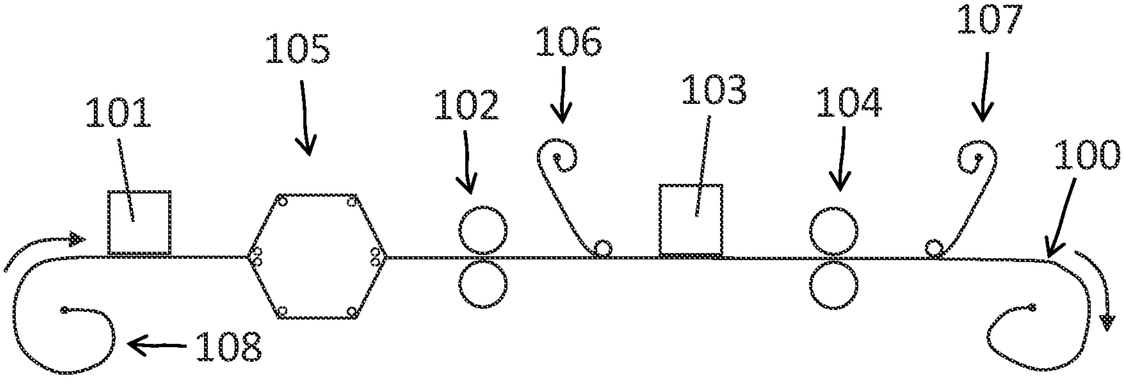
Figure 3:
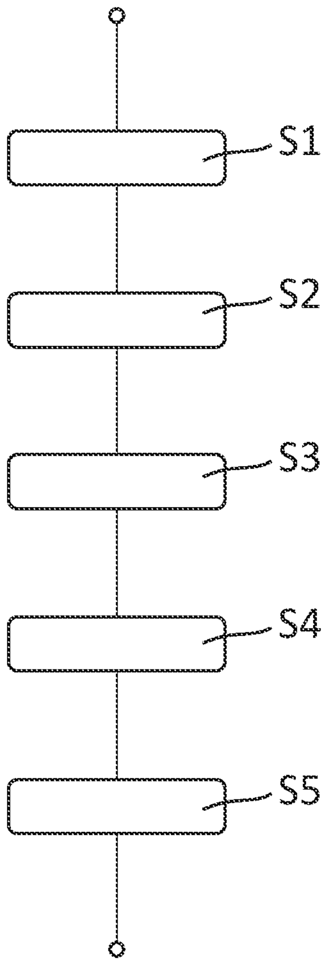

In the following, embodiments of the invention are explained with reference to schematic drawings. They show:

FIGS. 1-2 embodiments of a system for producing a functional label,

FIG. 3 a flow chart for a method for producing a functional label, and

FIGS. 4-7 various embodiments of the functional label according to FIGS. 1-3.

Elements of the same design and function are marked with the same reference signs across the figures. For reasons of clarity, not all of the elements shown in all of the figures are identified with the corresponding reference signs, possibly.

FIGS. 1 and 2 schematically show possible embodiments for a system for producing a functional label 1, as illustrated for example in FIGS. 4-7. A corresponding flow chart for a method for producing an embodiment of the functional label 1 is illustrated in FIG. 3.

The system according to FIG. 1 comprises a printing device 101, a die cutting device 102, a digital printing device 103 and another die cutting device 104.

In a step S1, a source material web 108 having a plurality of initial labels to be processed is provided. For example, the source material web comprises a first label layer 10 and a second label layer 20.

In a further step S2, a first printing process is performed and thereby a print is formed on the source material web 108 by means of the first printing device 101.

Subsequently, in a step S3, a first die-cutting process is performed and thereby a functional die-cut is formed in the source material web 108 by means of the first die-cutting device 102. Such a functional die-cut is for setting up a function of the functional label 1 and may comprise, for example, a formation of a hanger die-cut 13 and/or a security die-cut 16 in the first label layer 10, each in the form of one or more cuts, slits and/or perforations. Alternatively or additionally, forming the functional die-cut may also comprise inserting a hanger die-cut 23 and/or a security die-cut 26 in the second label layer 20, each of which is formed in the form of one or more cuts, slits and/or perforations (see FIGS. 4-7).

Subsequently, in a step S4, a second printing process separate from the first printing operation is performed by means of the digital printing device 103, thereby forming a digital print 14 on the first label layer 10 of the source material web 108.

In a further step S5, a second die-cutting process separate from the first die-cutting process is then carried out by means of the die-cutting device 104, thereby performing a format die-cutting in or on the source material web 108 and thus forming the functional label 1, which can be positioned in a plurality on a material web 100.

Figure 6:
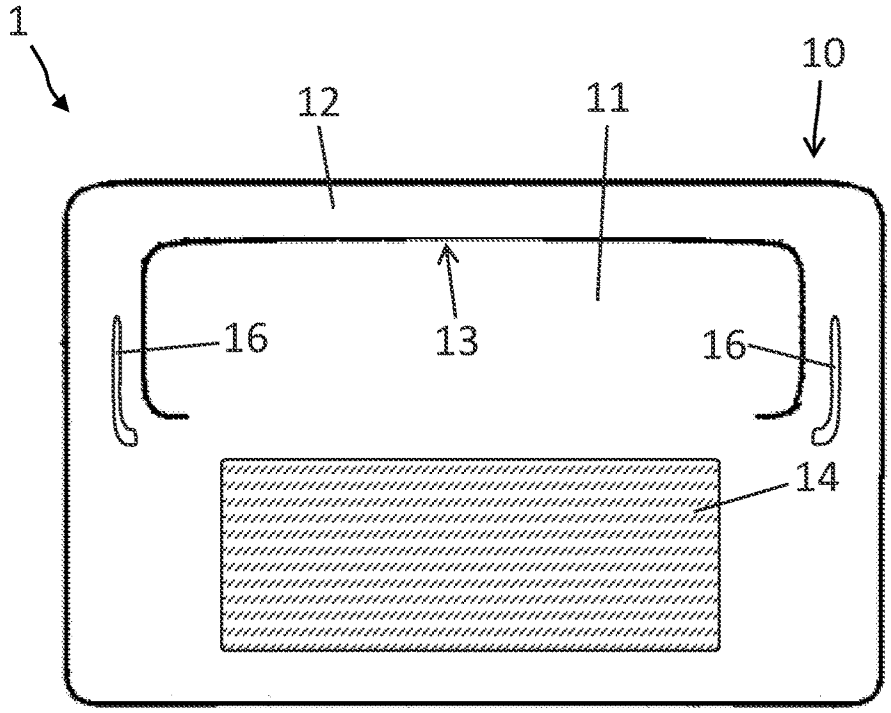
Figure 7:
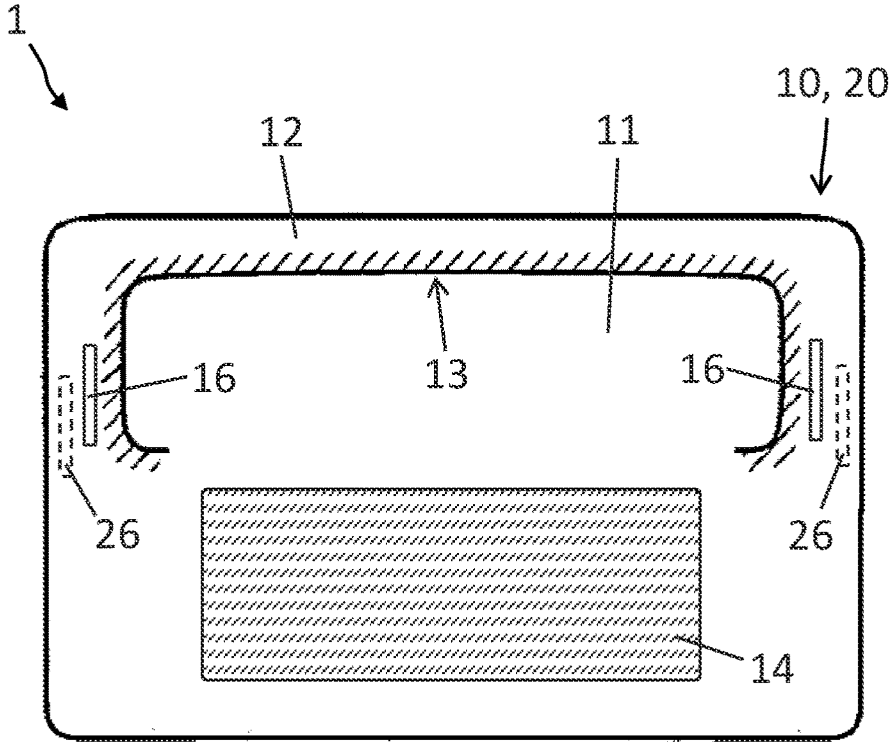

The described sequence of steps S1 to S5 may also vary and need not necessarily be carried out according to the sequence described. In this way, for example, embodiments of the functional label 1 can be produced as shown in FIGS. 6 and 7. The functional label 1 has, in the first label layer 10 and/or in the second label layer 20, one or more safety punched openings 16 and/or 26 in the form of purposefully introduced cuts and/or slits. These openings serve to reduce stress peaks when using the functional label 1 and the tensile forces that occur in the process, and thus contribute to increased tear resistance.

According to the system illustrated in FIG. 2, for example, the functional label can be formed with an integrated suspension device. In addition to the components illustrated in FIG. 1, the system according to FIG. 2 comprises a reverse printing device 105, a laminating device 106 and a take-off device 107.

First, a bottom material web is fed in, which realizes, for example, a material web of the second label layer 20. By means of the printing device 101, printing with silicone varnish can be carried out in flexographic printing. In the reverse printing device 105, printing is carried out in reverse printing, for example in order to carry out adhesive neutralization or adhesive weakening in sections by means of a varnish (for example in flexographic printing). This may also be referred to as an application or insertion of an adhesive weakening element 21, 22, as illustrated in the structure of the functional label 1 according to FIG. 5.

In the punching device 102, the functional die-cutting is carried out, which serves, for example, to realize a dispensing overlap and/or an increased tear resistance of a fold-out hanger.

Subsequently, by means of the laminating device 106, a laminating of a top material web can be carried out, which, for example, in the form of a top film, realizes a material web of the first label layer 10.

In the digital printing device 103, the printing is carried out in digital printing, in particular as an inkjet print, on the material web of the first label layer 10. Optionally, additional printing with further inks and/or varnishes can be carried out, for example to apply a luminescent varnish and/or a post-labeling varnish.

In the punching device 104, the format die-cutting is carried out and thereupon, in the take-off device 107, a grid take-off is carried out. Subsequently, the finished functional labels 1 are wound up on the material web 100.

Figure 4:
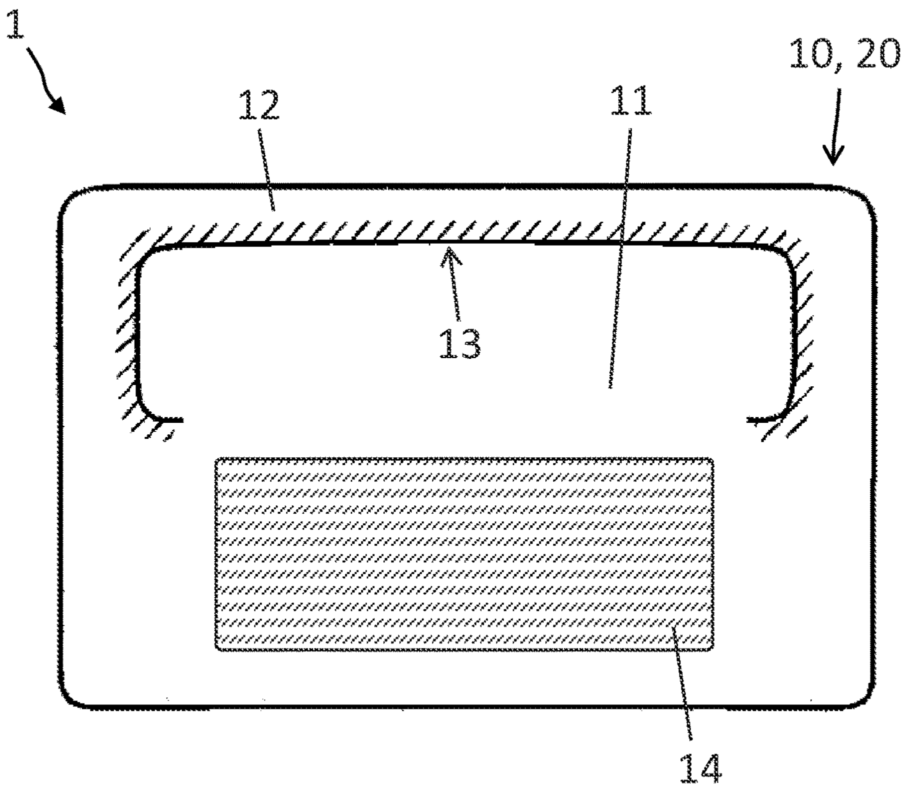
Figure 5:
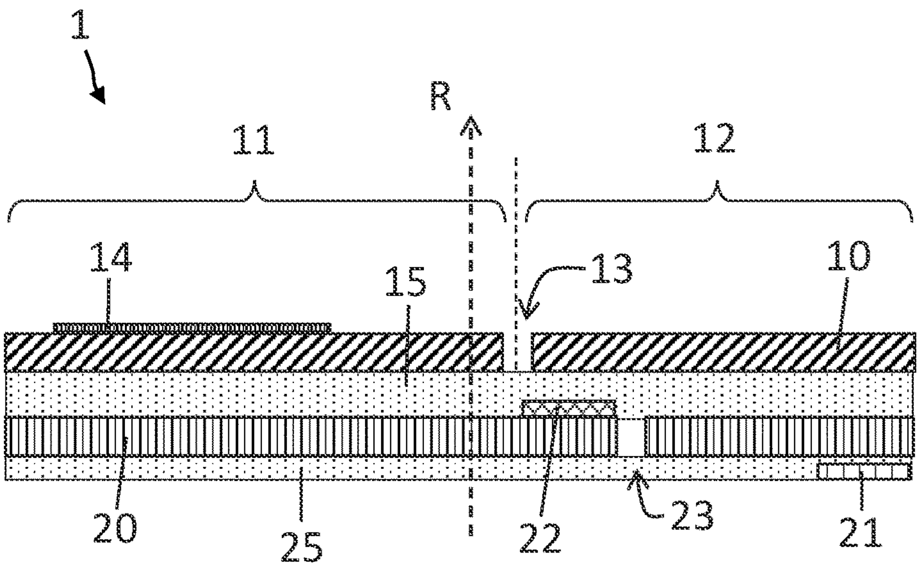

In this way, the embodiment of the functional label 1 shown in FIGS. 4 and 5 can be produced. In addition to the label layers 10 and 20, two adhesive layers 15 and 25 are formed, wherein the adhesive layer 15 bonds the first label layer 10 to the second label layer 20. With reference to the stacking direction R shown, the adhesive layer 15 is arranged between the two label layers 10 and 20 and comprises the adhesive weakening element 22, which is applied, for example in the form of an adhesive weakening varnish, at a predetermined position between the mutually offset hanger punchings 13 and 23 of the two label layers 10 and 20. Correspondingly analogously, a further adhesive weakening element 21 may be embedded or integrated in the adhesive layer 25. The adhesive layer 25 serves in particular for simple and reliable attachment of the functional label 1 to an object provided therefor, so that by means of the adhesive weakening element 21 a simplified detachment of the lower, second label layer 20 from the object and a folding out of the hoop is possible in order to form the suspension device.

The functional label 1 according to FIGS. 4 and 5 is therefore connected coherently via the two label layers 10 and 20 and the adhesive layer 15, the first label layer 10 having digital printing 14 as the top web and the second label layer 20 having conventional printing, for example with an adhesive weakener or silicone varnish, as the bottom web. In particular, digital printing 14 enables convenient and reliable printing with images and/or clichés without requiring a machine change. In addition, the functional label 1 as well as the material web 100 may also have a silicone paper which, for example, covers the lower adhesive layer 25 as a liner. Thus, in particular, the material web 100 may comprise two webs corresponding to the two label layers 10 and 20 applied to a roll of silicone paper.

LIST OF REFERENCE SIGNS

1 functional label
10 first label layer
11 information area
12 lift-off portion
13 hanger die-cut
14 digital printing
15 adhesive layer
16 security die-cutting
20 second label layer
21 first adhesive weakening element
22 second adhesive weakening element
23 hanger punching
25 adhesive layer
26 security die-cutting
100 material web
101 printing device
102 die cutting device
103 digital printing device
104 die cutting device
105 reverse printing device
106 laminating device
107 take-off device
108 source material web/initial label
R stacking direction
S(i) step of a method for producing a functional label

The invention claimed is:

1. A method for producing a functional label (1), comprising:

providing a source material (108) having one or more label layers (10, 20), performing a first printing process and thereby forming a print on the source material (108) by means of a first printing device (101), performing a first die cutting process and thereby forming a functional die cut (13, 16, 23, 26) in the source material (108) by means of a first die cutting device (102), performing a second printing process separate from the first printing process and thereby forming a digital print (14) on the source material (108) by means of a second printing device (103), and performing a second die cutting process separate from the first die cutting process and thereby forming a format punching in the source material (108) by means of a second die cutting device (104) and thereby forming the functional label (1).

2. The method of claim 1, wherein performing the first die cutting process and forming the functional die cut comprises:

making at least one punch, cut, slit and/or perforation in the source material (108) and forming a label area (12) that is liftable relative to an adjacent label area (11) so that a hanger element is foldable out of the functional label (1).

3. The method of claim 1, wherein performing the first die cutting process and forming the functional die cut comprises:

making at least one punch, cut, slit and/or perforation in the source material (108) and forming a weakening zone (16, 26) in a label area predetermined with respect to an intended operational use of the functional label (1) and tensile forces acting thereon.

4. The method of claim 1, wherein the source material (108) is provided as a multilayer label having a plurality of label layers (10, 20) and the first die-cutting process is performed such that the functional die-cutting (13, 16, 23, 26) is performed in or on one or more, but not all, label layers.

5. The method of claim 1, comprising:

providing a first label layer (10) and second label layer (20), and performing the first die-cutting process and forming a functional die-cut in the first and in the second label layer (10, 20), such that the first and the second label layer (10, 20) each have at least one die-cut, cut, slit and/or perforation (13, 16, 23, 26) which penetrates the respective label layer (10, 20) and which are formed offset from one another with respect to a main extension plane of the functional label (1) and transversely to a stacking direction (R) of the functional label (1).

6. The method of claim 1, wherein the source material (108) is provided as a multilayer label having a plurality of label layers (10, 20) and the first die-cutting operation and the formation of the functional die-cut (13, 16, 23, 26) is carried out in at least one of the label layers (10, 20) and subsequently the label layers (10, 20) are coupled to each other.

7. The method of claim 1, further comprising:

forming an adhesive layer (15) and introducing an adhesive weakening element (22) into the adhesive layer (15), such that the adhesive layer (15) is arranged after coupling label layers (10, 20) with each other between two label layers (10, 20) and the adhesive weakening element (22) is further arranged in an area of the functional die-cut (13, 16, 23, 26).

8. The method of claim 1, wherein the second printing process and the forming of the digital print (14) is performed subsequently to the first die-cutting process and the forming of the functional die-cut (13, 16, 23, 26).

9. The method of claim 1, wherein the first printing process and the forming of the print comprises printing with silicone varnish and/or printing with an adhesive neutralization.

10. The method of claim 1, wherein the first printing process and the forming of the print comprises applying a further digital print.

11. The method of claim 1, wherein the second printing process and forming the digital print (14) comprises inkjet printing.

12. The method of claim 1, further comprising:

performing a further printing process and applying a varnish and/or an ink.

13. The method of claim 1, wherein the source material (108) is provided in the form of a source material web and the respective process steps are performed multiple times to form a plurality of functional labels.

* * * * *